United States Patent [19]

Papeschi

[11] 4,029,904
[45] June 14, 1977

[54] RECEIVER CIRCUIT FOR AUTOMATIC CORRECTION OF DC LEVEL DISTURBANCES

[75] Inventor: Roberto Papeschi, Milan, Italy

[73] Assignee: U.S. Philips Corporation, New York, N.Y.

[22] Filed: Nov. 24, 1975

[21] Appl. No.: 634,769

[30] Foreign Application Priority Data

Nov. 27, 1974 Italy ................................ 29912/74

[52] U.S. Cl. .............................. 178/88; 325/324; 325/474

[51] Int. Cl.² ........................................ H04L 15/24

[58] Field of Search ............ 325/30.38 R, 320–324, 325/474, 476; 178/68, 88; 307/231, 235 R, 235 A

[56] References Cited

UNITED STATES PATENTS

| | | | |
|---|---|---|---|
| 3,008,007 | 11/1961 | De Koker et al. | 178/88 |
| 3,590,386 | 6/1971 | Tisi | 325/322 |
| 3,778,722 | 12/1973 | Stein | 178/88 |

Primary Examiner—Robert L. Griffin
Assistant Examiner—Jin F. Ng
Attorney, Agent, or Firm—Frank R. Trifari

[57] ABSTRACT

In a receiver of a transmission system for binary pulse signals whose DC level is disturbed during transmission, an accurate correction of the disturbing DC components is obtained even for pulse signals deviating considerably from the nominal transmission speeds and peak values, by using a correction circuit having two parallel branches between input and output. The first branch includes a capacitor between input and output and the second branch includes a peak detector and a comparator which co-operate for generating a binary decision signal which is applied to the output via a resistor. The AC components of the pulse signals are only passed through the first branch and the DC components inherent in the pulse signals are only passed through the second branch.

7 Claims, 9 Drawing Figures

RECEIVER CIRCUIT FOR AUTOMATIC CORRECTION OF DC LEVEL DISTURBANCES

The invention relates to a receiver in a transmission system for binary pulse signals, comprising an input circuit having a low output impedance from which the base band binary pulse signals are derived, a circuit connected to the input circuit for automatic correction of disturbances in the DC level of the binary pulse signals caused during transmission, and a pulse regenerator having a high input impedance to which the correction circuit and a reference source are connected for regenerating the binary pulse signal. Such receivers may be used in transmission systems in which binary pulse signals such as data signals or telegraphy and telex signals are transmitted without using modulation, but are especially used in carrier telegraphy systems in which a number of telegraphy signals is transmitted by means of frequency shift keying in frequency division multiplex within the frequency band of a voice channel.

The disturbances in the DC level of the binary pulse signals at the receiver end of the transmission system may have causes. In addition to an erroneous adaptation of the receiver input circuit to the transmission path and the influence of temperature, fluctuations and ageing phenomena in the receiver, the stability of the central frequency in the transmitter and that of the frequency discriminator in the receiver are important in the said carrier telegraphy systems and particularly the frequency off-set in the carrier systems between the transmitter and the receiver exceeding the allowance according to the CCITT recommandations for voice channels of ± 2 Hz.

Several types of circuits are known for automatic correction of the DC level disturbances caused during transmission. Many of these known correction circuits use a clamping technique in which threshold values are derived from the instantaneous positive and negative peak values, which threshold values have a predetermined distance from these peak values and in which the pulse signals are clamped on these threshold values. One requirement for their satisfactory operation is that the transmitted pulse signals always reach in the nominal peak values. Since the instantaneous peak values are, however, dependent on the succession of mark and space elements in the pulse signals and on the transmission speed of the pulse signals, both as a result of the dynamic behaviour of the filters in the receiver input receiver, and since these instantaneous peak values are additionally influenced by noise and signals in adjacent frequency bands, deviations relative to the nominal peak values and the threshold values derived therefrom occur in practice, which deviations result in jitter of the transitions in the regenerated pulse signals about the desired instants.

Other known correction circuits use a series capacitor for blocking the direct voltage. Here, too, a requirement for the satisfactory operation is that the transmitted pulse signals always reach their nominal peak values. In addition special measures necessary in this case for maintaining the correct DC level after the series capacitor after a large number of successive elements of the same value in the pulse signals and after interruptions in the transmission path so that both the structure and the adjustment of this type of correction circuit is complicated.

Likewise as the correction circuits using clamping techniques the latter type of correction circuit is less suitable for pulse signals having higher transmission speeds than the nominal transmission speed on which the design of the receiver input filters is based, and for predistorted pulse signals in which the duration of the mark elements is not equal to that of the space elements, because both types of correction circuits introduce in these cases a considerable extra distortion in the regenerated pulse signals.

It is a object of the invention to provide a novel conception of a correction circuit in a receiver of the kind described in the preamble which correction circuit, even for pulse signals in which the deviations relative to the nominal peak values and transmission speeds amounts to 50% and for pulse signals with predistortions up to 30% corrects the disturbances in the DC level over a large disturbance range very accurately and introduces only a minimum extra distortion in the regenerated pulse signals, which correction circuit is yet simple in structure and adjustment and is additionally very suitable for integration in a semiconductor body.

The receiver according to the invention is characterized in that the correction circuit comprises two parallel branches whose inputs are connected to the receiver input circuit and whose outputs are connected to the pulse regenerator, the first branch including a series capacitor and the second branch including a peak detector for deriving a threshold signal from the peak values of the binary pulse signals, and a comparator for generating a binary decision signal in response to both the threshold signal and the binary pulse signals, said comparator being coupled through a resistor with the output of the second branch, the time constant formed by the resistor in the second branch and by the series capacitor in the first branch being much larger than the duration of an element in the binary pulse signals.

The invention and its advantages will now be described in greater detail with reference to the Figures.

Figure 1:
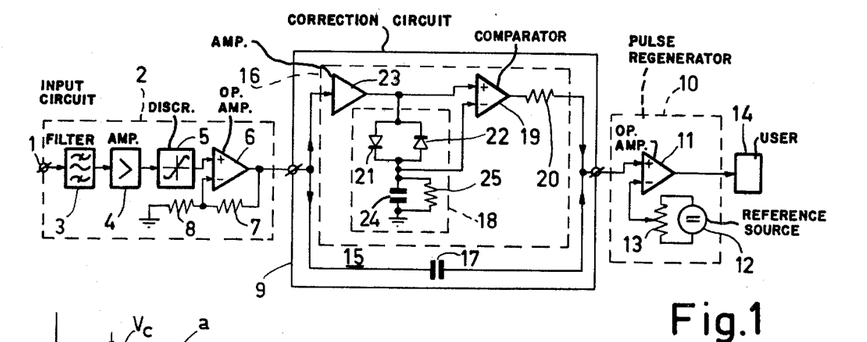
FIG. 1 shows a receiver according to the invention.

The receiver in FIG. 1 is arranged as a channel receiver in a carrier telegraphy system in which telegraphy signals are transmitted at a transmission speed of, for example, 50 Baud by means of frequency shift keying. A bandwidth of 120 Hz is available per channel and the frequency shift between mark and space frequency is 2 × 30 Hz.

The signals derived from the transmission path and varying in frequency in accordance with the elements of the telegraphy signal occur at input 1 of the receiver in FIG. 1. These signals are applied in an input circuit 2 through a channel filter 3 having a bandwidth of 120 Hz and a limiting amplifier 4 to a frequency discriminator 5 which supplies either a positive or a negative direct voltage dependent on whether the mark or the space frequency is received. An operational amplifier 6 whose output is coupled through resistors 7, 8 with its inverting input is connected to the frequency discriminator 5 so that the input circuit 2 has a low output impedance and in practice operates as a voltage source from which the telegraphy signal in the base band is derived.

This telegraphy signal is applied through a circuit 9 for automatic correction of DC level disturbances caused during transmission to a pulse regenerator 10 having a high input impedance. This pulse regenerator 10 is preferably constituted by an operational amplifier 11 having a non-inverting input for the telegraphy signal to be regenerated and an inverting input for a reference signal which is derived from a reference source 12 by means of an adjustable voltage divider 13. The regenerated telegraphy signal is passed on for further processing to a user 14.

To obtain a very accurate correction of the disturbances in the DC level of the telegraphy signal the correction circuit 9 in the receiver according to the invention comprises two parallel branches 15, 16 whose inputs are connected to the receiver input circuit 12 and whose outputs are connected to the pulse regenerator 10. The first branch 15 includes a series capacitor 17 and the second branch 16 includes a peak detector 18 for deriving a threshold signal from the peak values of the telegraphy signal and a comparator 19 for generating a binary decision signals in response to both the threshold signal and the telegraphy signal, said comparator 19 being coupled through a resistor 20 with the output of the second branch 16. The time constant formed by resistor 20 in branch 16 and by series capacitor 17 in branch 15 is much larger than the duration of an element in the telegraphy signal.

In the embodiment of FIG. 1 the threshold signal in the second branch 16 is derived from the peak values of the telegraphy signal by subtracting from these peak values a constant signal value; furthermore the binary decision signal is obtained by amplifying and limiting the difference between this threshold signal and the telegraphy signal.

To this end the peak detector 18 of FIG. 1 includes two diodes 21, 22 whose unequal electrodes are interconnected; one junction is coupled with the input of branch 16 through a separation amplifier 23 and the other junction is coupled with a point of zero potential through a capacitor 24. This capacitor 24 is shunted by a resistor 25 having such a value that the time constant of the discharge of capacitor 24 through resistor 25 is much larger than the duration of an element in the telegraphy signal. The knee voltage of the diodes 21, 22 constitutes the constant signal value which is subtracted from the peak values of the telegraphy signal so that the threshold signal occurs across capacitor 24. The comparator 19 is constituted by an operational amplifier having a non-inverting input for the telegraphy signal at the output of amplifier 23 and an inverting input for the threshold signal at the junction of diodes 21, 22 and capacitor 24.

As long as no transition occurs in the telegraphy signal, the threshold signal stored in capacitor 24 remains constant. However, when a transition occurs in the telegraphy signal, this threshold signal must remain constant for such a period that comparator 19 can determine this transition and this threshold signal must subsequently adjust quickly at the value associated with the new peak value of the telegraphy signal. Since immediately after the commencement of a transition both diodes 21, 22 do not conduct and the discharge through resistor 25 has a large time constant, the threshold signal stored in capacitor 24 remains constant. At the instant when the difference between telegraphy signal and threshold signal changes its sign, a transition occurs in the binary decision signal of comparator 19. Subsequently the threshold signal also remains constant until the difference between telegraphy and threshold signal again reaches a value which is equal to the knee voltage of the diodes 21, 22. At that instant one of the diodes 21, 22 starts to conduct so that capacitor 24 can discharge through the conducting diode until the telegraphy signal reaches its new peak value at the end of the transition and simultaneously the threshold signal reaches its associated value. As a result of the very low resistance of the conducting diode the time constant of the discharge of capacitor 24 through this diode is very small and the threshold signal can indeed adjust quickly at the correct new value after determination of the transition in comparator 19.

Figure 2:
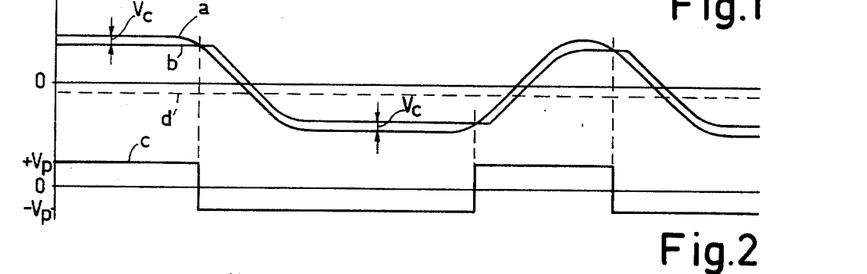
FIGS. 2, 3 and 4 show a number of time diagrams to explain the operation of the correction circuit used in the receiver according to FIG. 1.

The above is illustrated in the time diagrams of FIG. 2 in which the telegraphy signal at the output of amplifier 23 is represented by curve $a$. The threshold signal derived by means of peak detector 18 from curve $a$ is represented in FIG. 2 by curve $b$, $V_c$ being the constant signal value equal to the knee voltage of diodes 21, 22. Furthermore the decision signal generated by comparator 19 is represented by curve $c$ in FIG. 2 in which the transitions occur at the instants when curve $a$ intersects curbe $b$. These instants are not influenced by disturbances in the DC level of the telegraphy signal. These disturbances becomes manifest in a shift of the zero line of curve $a$, for example, to the position represented in FIG. 2 by dashed line $d$, but due to such a shift the position of curve $b$ does not change relative to curve $a$ and consequently no change occurs in the position of the points of intersection of curves $a$ and $b$. These disturbances neither have any influence on the two levels of curve $c$ which are completely determined by comparator 19. The levels of the decision signal at the output of comparator 19 are adjusted at the nominal peak values of the telegraphy signal at the output of receiver input circuit 2.

The operation of the correction circuit 9 in the receiver according to the invention will now be explained with reference to the time diagrams of FIG. 3.

Figure 3:
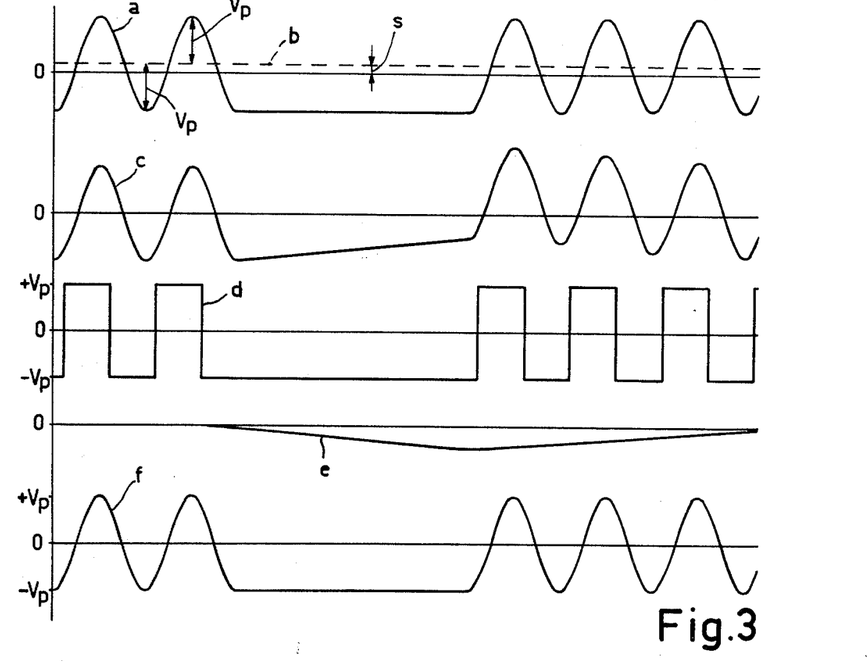

A telegraphy signal having, for example, the shape represented by curve $a$ in FIG. 3 is received at the output of receiver input circuit 2. This telegraphy signal may be considered as the composition of three types of components:

1. AC components related to the transitions in the telegraphy signal,
2. DC components inherent in the telegraphy signal,
3. DC components resulting from disturbances in the DC level of the telegraphy signal during transmission.

In FIG. 3, the disturbing DC components are represented by a shift $s$ of the ideal zero line $b$ of curve $a$ relative to the real zero line. Furthermore it has been assumed that in the absence of these disturbing DC components the telegraphy signal always reaches its nominal peak values $+V_p$ and $-V_p$, in other words the peak values of curve $a$ in FIG. 3 are located at a distance $V_p$ from the ideal zero line $b$.

The two branches 15 and 16 of correction circuit 9 block the disturbing DC components of telegraphy signal *a* at the output of receiver input circuit 2. In fact, in the first branch 15 series capacitor 17 neither passes the disturbing DC components nor the DC components inherent in telegraphy signal *a* so that a signal of the shape represented by curve *c* in FIG. 3 occurs at the output of the first branch 15. Also in the second branch 16 the disturbing DC components of telegraphy signal *a* are not passed because they have no influence at all on the level and the transition instants of the decision signal of comparator 19, as already explained hereinbefore. Consequently a decision signal of the shape represented by curve *d* in FIG. 3 occurs at the output of comparator 19 in the second branch 16. Apart from a constant time delay of the crossings in telegraphy signal *a* through zero line *b* relative to the transitions in decision signal *d*, this decision signal *d* corresponds to the correctly regenerated telegraphy signal *a*. Unlike the disturbing DC components, the DC components inherent in telegraphy signal *a* are present in this decision signal *d*.

Resistor 20 in the second branch 16 and capacitor 17 in the first branch 15 constitute a low-pass filter for the decision signal *d* at the output of comparator 19 so that the second branch 16 exclusively passes the DC components inherent in telegraphy signal *a* and a signal of the shape represented by curve *e* in FIG. 3 occurs at the output of this second branch 16. This capacitor 17 and this resistor 20 also constitute a high-pass filter for the telegraphy signal *a* at the output of receiver input circuit 2 so that the first branch 15 exclusively passes the AC components represented by curve *e* in FIG. 3.

The combination of the output signals *c* and *e* of the first branch 15 and the second branch 16 results in a telegraphy signal of the shape represented by curve *f* in FIG. 3 at the output of correction circuit 9. The disturbing DC components of telegraphy signal *a* are completely eliminated by correction circuit 9 and are thus no longer present in telegraphy signal *f*, but on the other hand the AC components and the DC components inherent in telegraphy signal *a* are present. In addition their mutual ratio is correct because the levels of decision signal *d* are equal to the nominal peak values of telegraphy signal *a* and the low-pass filter for decision signal *d* is constituted by the same components which also constitute the high-pass filter for telegraphy signal *a*. Thus the time constants of the two filters are the same and are substantially equal to that of resistor 20 with capacitor 17 because both input circuit 2 and comparator 19 have a low output impedance and consequently operate in practice as voltage sources, whereas both pulse regenerator 10 and separation amplifier 23 have a very high input impedance and thus do not substantially influence signals applied thereto. As already stated, the time constant of resistor 20 with capacitor 17 is much larger than the duration of an element in telegraphy signal *a*. The AC components present in decision signal *d* and related to the transitions are thus completely suppressed while the said time delay of telegraphy signal *a* relative to decision signal *d*, which delay is shorter than the duration of an element in telegraphy signal *a*, does not have any appreciable influence on the output signal *e* of the second branch 16. The shape of telegraphy signal *f* at the output of correction circuit 9 therefore accurately corresponds to the shape of telegraphy signal *a* at the output of receiver input circuit 2, the real zero line of telegraphy signal *f* coinciding with the ideal zero line *b* of telegraphy signal *a*.

In this manner the disturbances in the DC level of the telegraphy signal, which disturbances may amount in practice to ±15% of the nominal peak-to-peak value of the telegraphy signal, are always very accurately corrected by the described correction circuit 9. Furthermore the correct DC level at the output of this correction circuit 9 is also maintained for an arbitrarily ling static state of the telegraphy signal because the second branch 16 ensures the galvanic continuity required for this purpose. By applying the telegraphy signal at the output of correction circuit 9 to pulse regenerator 10, whose reference signal is adjusted at the correct value (in this case the value of zero), the telegraphy signal is regenerated very accurately.

In the explanation hitherto given it has been assumed that in the absence of disturbing DC components the telegraphy signal at the output of the receiver input circuit 2 always reaches its nominal peak values. In practice, however, the instantaneous peak values of the telegraphy signal often exhibit considerable deviations from these nominal peak values.

The realization of the filters in receiver input circuit 2 (channel filter 3 and the post-detection filter of frequency discriminator 5 not further shown in FIG. 1) play an important role in the occurrence of these deviating peak values. These filters must be designed in such a manner that on the one hand they influence the signals in the own channel as little as possible, but on the other hand suppress the signals in adjacent channels as well as possible. In addition, in their design the fact must be taken into account that it is required in many applications that the receiver also operates properly if the telegraphy signals are transmitted at higher speeds than the nominal transmission speed of the channel. The practical realization of the filters is always a compromise between these design requirements.

A result of this compromise is that the instantaneous peak values are not only influenced by noise and monochromatic disturbances in the own channel, but also by signals in adjacent channels ("adjacent channel interference"). Another result is that these peak values also depend on the succession of mark and space elements in the telegraphy signals ("intersymbol interference"); these peak values are, for example, lower for alternately occurring mark and space elements than for a static state. A further result is that these peak values are also dependent on the transmission speed of the telegraphy signal; for example, for a telegraphy signal with alternately occurring mark and space elements transmitted at a speed which is 50% higher than the nominal transmission speed (thus in FIG. 1 at a speed of 75 Baud instead of 50 Baud) the peak-to-peak value decreases to approximately 50% of the nominal peak-to-peak value. A similar influence is exerted by the transmission of a predistorted telegraphy signal; for example, for a telegraphy signal having a nominal transmission speed in which the duration of the isolated mark elements is twice as long as that of the isolated space elements, the instantaneous peak value for an isolated space element likewise decreases to approximately 50% of the nominal peak value.

Since in the present correction circuit 9 the threshold signal in the second branch 16 is derived from the peak values of the telegraphy signal at the output of receiver input circuit 2, the described deviations from the nominal peak values will have a disturbing influence on the instants of the transitions in the decision signal generated by comparator 19. This influence will be described with reference to the diagrams in FIG. 4 in which it has been assumed that there are no disturbing DC components in the telegraphy signal.

Figure 4:
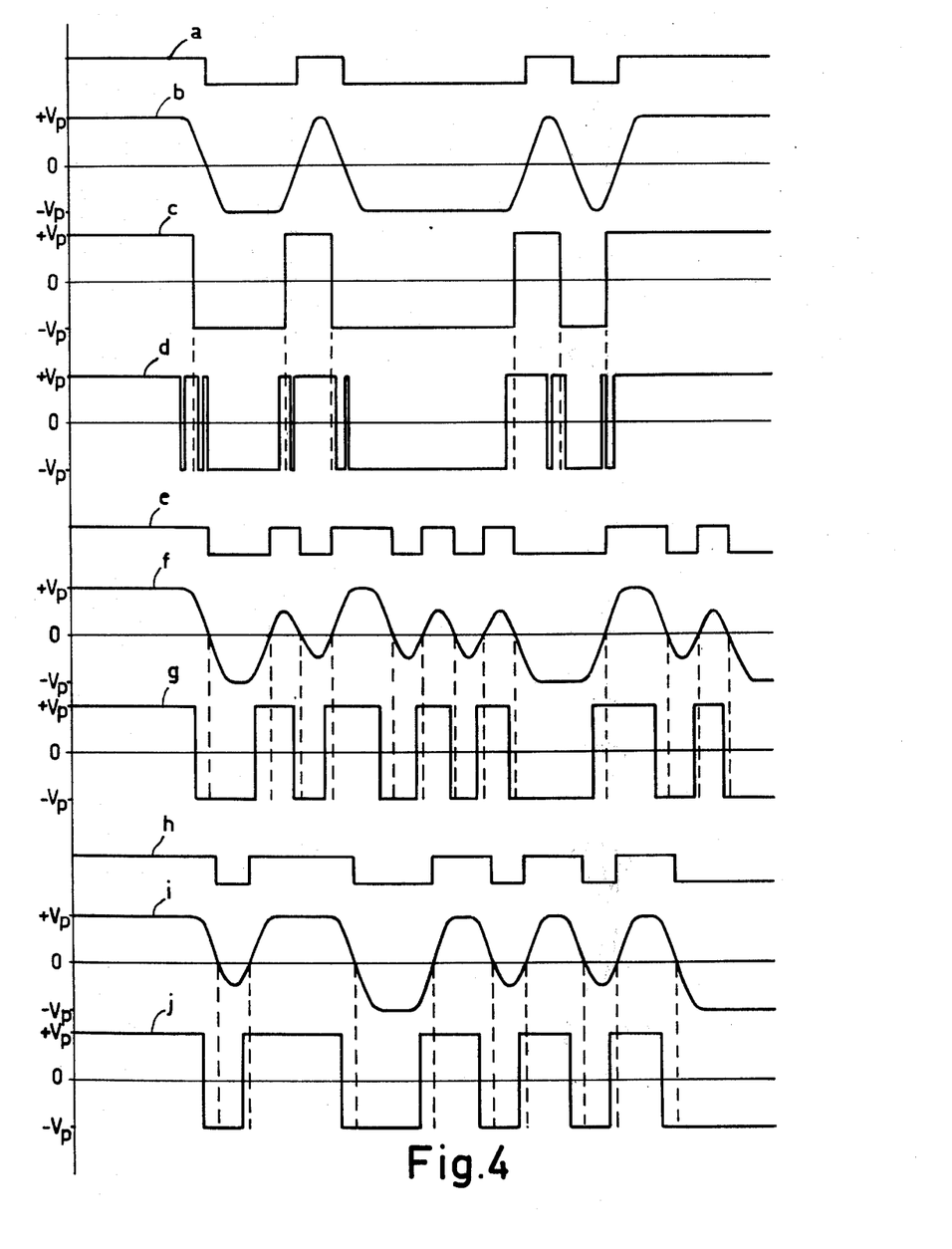

If a telegraphy signal of, for example, the shape represented by curve $a$ in FIG. 4 is transmitted at the nominal transmission speed and if the telegraphy signal at the output of input circuit 2 always reaches its nominal peak values, the latter telegraphy signal will have the shape represented by curve $b$ in FIG. 4 (compare curve $a$ in FIG. 3) and the decision signal at the output of comparator 19 will have the shape represented by curve $c$ in FIG. 4 (compare curve $d$ in FIG. 3). The deviating peak values caused by noise and monochromatic disturbances in the own channel, by adjacent channel interference and intersymbol interference have, however, the result that in practice a decision signal having the shape represented by curve $d$ in FIG. 4 occurs at the output of comparator 19. In this decision signal $d$ not only arbitrary variations of the desired transition instants occur but also parasitic transitions in the vicinity of the desired transitions. This type of fluctuation, i.e. jitter of the desired transition instants, is absolutely inadmissible in the output signals of pulse regenerator 10. In the present correction circuit 9 this jitter substantially has no influence on the output signal of the second branch 16 (compare curve $e$ in FIG. 3). Decision signal $d$ in FIG. 4 may be considered as the composition of decision signal $c$ in FIG. 4 and disturbing AC components related to the transitions in this decision signal $c$. As already extensively described, the AC components of decision signal $c$ related to the transitions are completely suppressed by the low-pass filter constituted by resistor 20 in the second branch 16 and capacitor 17 in the first branch 15 so that also the disturbing AC components of decision signal $d$ will be completely suppressed by this low-pass filter 20, 17. The jitter in decision signal $d$ caused by deviating peak values thus does not in practice penetrate as far as the output signal of correction circuit 9 (compare curve $f$ in FIG. 3) and consequently this correction circuit 9 introduces substantially no extra distortion into the output signals of pulse regenerator 10, even when the peak values in the telegraphy signal of input circuit 2 deviate from the nominal peak values.

The above-mentioned considerations also apply to the deviating peak values caused by a higher transmission speed or a pre-distortion of the telegraphy signal. If a telegraphy signal is transmitted at a 50% higher speed than the nominal transmission speed and if this signal has, for example, the shape represented by curve $e$ in FIG. 4, a telegraphy signal of the shape represented by curve $f$ in FIG. 4 will occur at the output of input circuit 2 as a result of this higher speed and a decision signal of the shape represented by curve $g$ in FIG. 4 will occur at the output of comparator 19. Likewise, in case of a pre-distorted telegraphy signal having a shape represented by curve $h$ in FIG. 4 the telegraphy signal at the output of input circuit 2 will have the shape represented by curve $i$ in FIG. 4 as a result of the pre-distortion and the decision signal at the output of comparator 19 will have the shape represented by curve $j$ in FIG. 4. As has been shown in FIG. 4, the deviating peak values cause considerable variations in the time delays of the zero crossings in telegraphy signals $f$ and $i$ relative to the transitions in decision signals $g$ and $j$. However, also these fluctuations of the desired transition instants can be considered as disturbing AC components related to the zero crossings in telegraphy signals $f$ and $i$ which are completely suppressed in the manner described hereinbefore by low-pass filter 20, 17. The fluctuations caused by a higher transmission speed or a pre-distortion thus do not in practice penetrate as far as the output signal of correction circuit 9 so that also in these cases the present correction circuit 9 substantially does not introduce any extra distortion into the output signals of pulse regenerator 10.

Consequently, even the greatest deviations occurring in practice relative to the nominal peak values and transmission speeds and the greatest predistortion occurring in practice do not have any influence on the correct operation of the described circuit for automatic correction of disturbances in the DC level of the telegraphy signal, and even in the most unfavourable case this correction circuit will introduce no appreciable extra distortion into the regenerated telegraphy signal.

In addition all mentioned advantages are obtained by means of a correction circuit which is very simple in structure and which obviates external adjustments. Furthermore no special requirements need be imposed on the tolerances of the different components so that the correction circuit can be fairly simply realized as a monolithic or hybrid integrated circuit.

Figure 5:
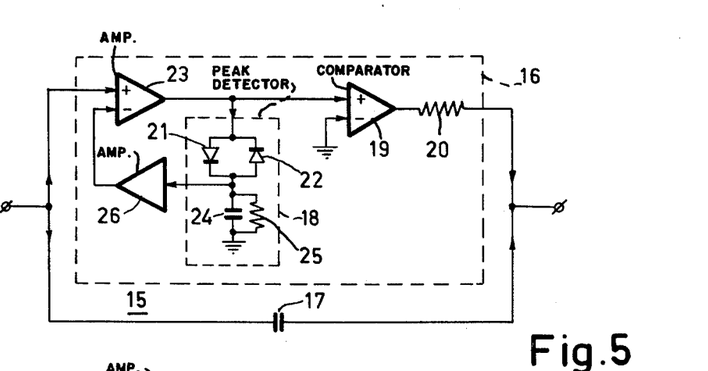
FIGS. 5 and 6 show modifications of the correction circuit used in FIG. 1.

FIG. 5 shows a modification of the correction circuit 9 of FIG. 1, corresponding elements in both Figures having the same reference numerals. The correction circuit in FIG. 5 only differs from that in FIG. 1 as regards the realization of the second branch 16. In FIG. 5 the separation amplifier 23 also operates as a difference circuit having a noninverting input for the telegraphy signal applied to the second branch 16 and an inverting input to which the junction of diodes 21, 22 and capacitor 24 in peak detector 18 is connected through an amplifier 26 having a large amplification factor. Furthermore the inverting input of comparator 19 is connected to a point of zero potential.

As regards the operation of the second branch 16 of the correction circuit there is no difference between the embodiments of FIG. 1 and FIG. 5 provided that the amplification factor of amplifier 26 in FIG. 5 is much larger than one. If, for example, a telegraphy signal of the shape represented by curve $a$ in FIG. 2 occurs at the non-inverting input of difference circuit 23, the threshold signal occurring at the inverting input of difference circuit 23 likewise has the shape of curve $b$ of FIG. 2 so that the difference signal at the output of difference circuit 23 likewise changes its sign at the instants when curve $a$ intersects curve $b$. The decision signal generated by comparator 19 in FIG. 5 thus completely corresponds to that of comparator 19 in FIG. 1 and has the shape of curve $c$ in FIG. 2.

Figure 6:
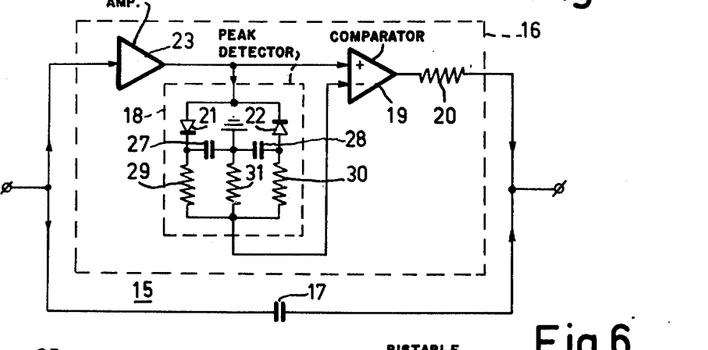

FIG. 6 shows a further modification of the correction circuit 9 of FIG. 1, corresponding elements in both Figures again having the same reference numerals. The correction circuit in FIG. 6 is different from that in FIG. 1 because the threshold signal in the second branch 16 is now constituted by the algebraic average of the positive and negative peak values of the telegraphy signal.

To this end the peak detector 18 in FIG. 6 has two parallel branches between its input and a point of zero potential, each branch being constituted by the series arrangement of a diode 21,22 and a capacitor 27, 28. The diodes 21, 22 are arranged in such a way that one branch 21,27 constitutes a peak detector for positive values of the telegraphy signal and the other branch 22,28 constitutes a peak detector for negative values.

The junctions of diodes 21,22 and capacitors 27,28 are interconnected via two equal and large resistors 29,30 and the junction of these resistors is connected to the point of zero potential via a large resistor 31. The values of the capacitors 27,28 and the resistors 29,30,31 are chosen to be such that the time constant of the discharge of these capacitors 27,28 is much larger than the duration of an element in the telegraphy signal. The desired threshold signal occurs at the junction of resistors 29,30,31 to which the inverting input of comparator 19 is connected.

Figure 7:
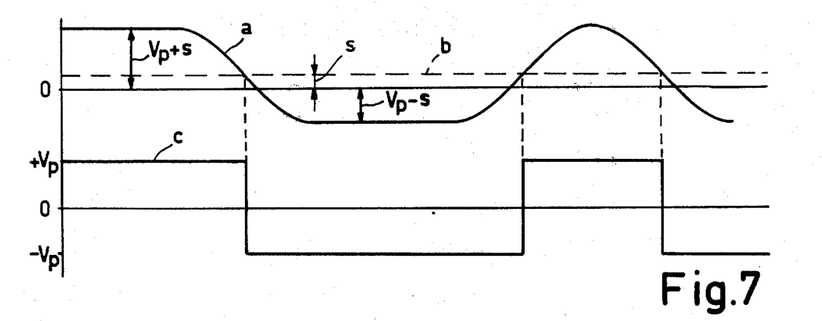
FIG. 7 shows a number of time diagrams to explain the operation of the correction circuit according to FIG. 6.

The operation of the second branch 16 in FIG. 6 will now be described with reference to the time diagrams in FIG. 7 in which the telegraphy signal at the output of separation amplifier 23 is represented by curve $a$. The disturbing DC components are represented in FIG. 7 by the shift $s$ of the ideal zero line $b$ of curve $a$ relative to the real zero line; furthermore it has again been assumed that the peak values of curve $a$ are located at the nominal distance $V_p$ from the ideal zero line $b$.

For positive values of telegraphy signal $a$ diode 22 does not conduct and capacitor 27 is then charged via diode 21 to substantially the positive peak value $+(V_p + s)$. For negative values of telegraphy signal $a$ diode 21 does not conduct and capacitor 28 is then charged via diode 22 to substantially the negative peak value $-(V_p - s)$. Since the discharge of capacitors 27,28 has a large time constant, a threshold signal will occur at the junction of the equal resistors 29,30 which signal is always substantially equal to the algebraic average of the positive and negative peak values, in formula:

$$[ (V_p + s) - (V_p - s) ] / 2 = s$$

This threshold signal is thus equal to the shift of the ideal zero line $b$ of curve $a$ relative to the real zero line. The decision signal generated by comparator 19 is represented by curve $c$ in FIG. 7 in which the transitions occur at the instants when curve $a$ intersects its ideal zero line $b$. The disturbing DC components of telegraphy signal $a$ thus have no influence on the levels nor on the transition instants of this decision signal $c$. The DC components inherent in telegraphy signal $a$ are then obtained at the output of the second branch 16 in FIG. 6 in the same manner as in FIG. 1 by means of the low-pass filter constituted by resistor 20 and capacitor 17.

Likewise as in the correction circuits of FIGS. 1 and 5, the deviations occurring in practice relative to the nominal peak values of the telegraphy signal will also cause jitter of the transition instants in the decision signal in the correction circuit of FIG. 6. However, also in this case this jitter may be considered as disturbing AC components which are related to the zero crossings of the telegraphy signal and are completely suppressed by the low-pass filter 20,17 in the manner already extensively described. Consequently also in the embodiment of FIG. 6 the jitter of the transition instants in the decision signal substantially does not have any influence on the correct operation of the correction circuit and this correction circuit neither introduces any appreciable extra distortion into the regenerated telegraphy signal.

Figure 8:
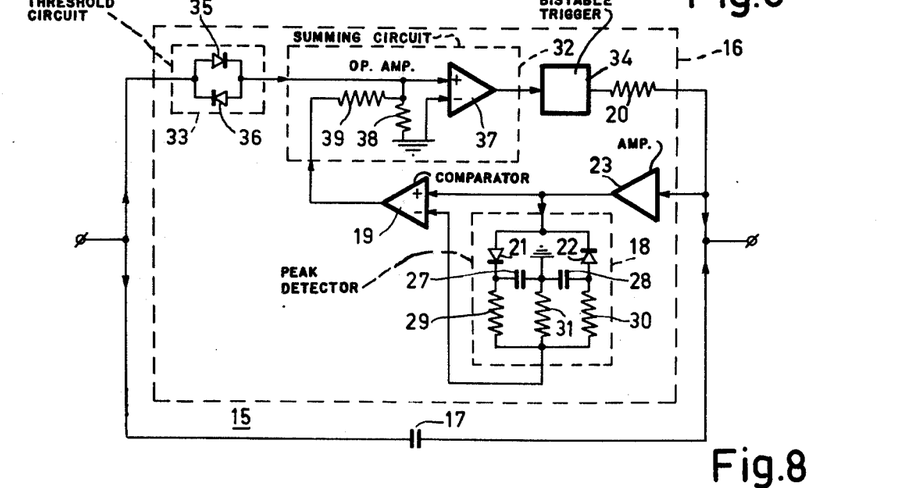
FIG. 8 shows a modification of the correction circuit according to FIG. 6.

FIG. 8 shows a modification of the correction circuit of FIG. 6, corresponding elements in both Figures having the same reference numerals.

In the second branch 16 of the correction circuit of FIG. 8 the DC components inherent in the telegraphy signal are derived from the output signal of the correction circuit and not from the input signal as in FIG. 6. The telegraphy at input and output of the correction circuit are only different in that the disturbing DC components are no longer present in the telegraphy signal at the output. By starting from this telegraphy signal at the output for the recovery of the DC components inherent in the telegraphy signal, a greater dynamic range than that in FIG. 6 is obtained in the correction circuit of FIG. 8. Furthermore branch 16 in FIG. 8 is arranged in such a manner that the galvanic continuity of the correction circuit is maintained so that the correct level of the telegraphy signal at the output is also ensured for an arbitrarily long static state of the telegraph signal at the input.

To this end branch 16 in FIG. 8 includes a summing circuit 32 a first input of which is coupled with the input of branch 16 via a double-ended threshold circuit 33 passing only the values of the telegraphy signal that are larger than the threshold levels. Furthermore the output of branch 16 is coupled with the two inputs of comparator 19 and this via amplifier 23 with the non-inverting input and via amplifier 23 and double peak detector 18 with the inverting input, while the output of comparator 19 is connected to a second input of summing circuit 32. The output of summing circuit 32 is connected to a bistable trigger 34 whose output is coupled with the output of branch 16 via resistor 20. The double-ended threshold circuit 33 and summing circuit 32 are arranged in such a manner that for values of the telegraphy signal which are larger than the threshold levels the influence of the telegraphy signal on the output signal of summing circuit 32 prevails over the influence of the decision signal at the output of comparator 19.

The double-ended threshold circuit 33 in FIG. 8 has two diodes 35,36 whose unequal electrodes are interconnected while one junction is connected to the input of branch 16 and the other junction is connected to the first input of summing circuit 32. The knee voltages of diodes 35, 36 constitute the threshold levels of threshold circuit 33 which thus constitutes a very low impedance for telegraphy signal values which are larger than this knee voltage and a very high impedance for telegraphy signal values which are smaller than this knee voltage. These threshold levels are chosen to be lower than the lowest possible instantaneous peak values of the telegraphy signal and are, for example, $+0.3\ V_p$ and $-0.3\ V_p$ where $V_p$, as hereinbefore, is the nominal peak value. The summing circuit 32 in FIG. 8 is constituted by an operational amplifier 37 whose inverting and non-inverting inputs are connected directly and via a resistor 38, respectively, to a point of zero potential, while the first and second inputs of summing circuit 32 are connected directly and via a resistor 39, respectively, to the non-inverting input of amplifier 37. The values of the resistors 38,39 are chosen so that the fraction of the decision signal of comparator 19 occurring at the input of amplifier 37 is always smaller than the threshold levels of threshold circuit 33. The bistable trigger 34 is arranged in such a manner that its output signal is positive for a positive output signal of summing circuit 32 and conversely, and that its output levels are equal to the nominal peak values $+V_p$ and $-V_p$ of the telegraphy signal.

Figure 9:
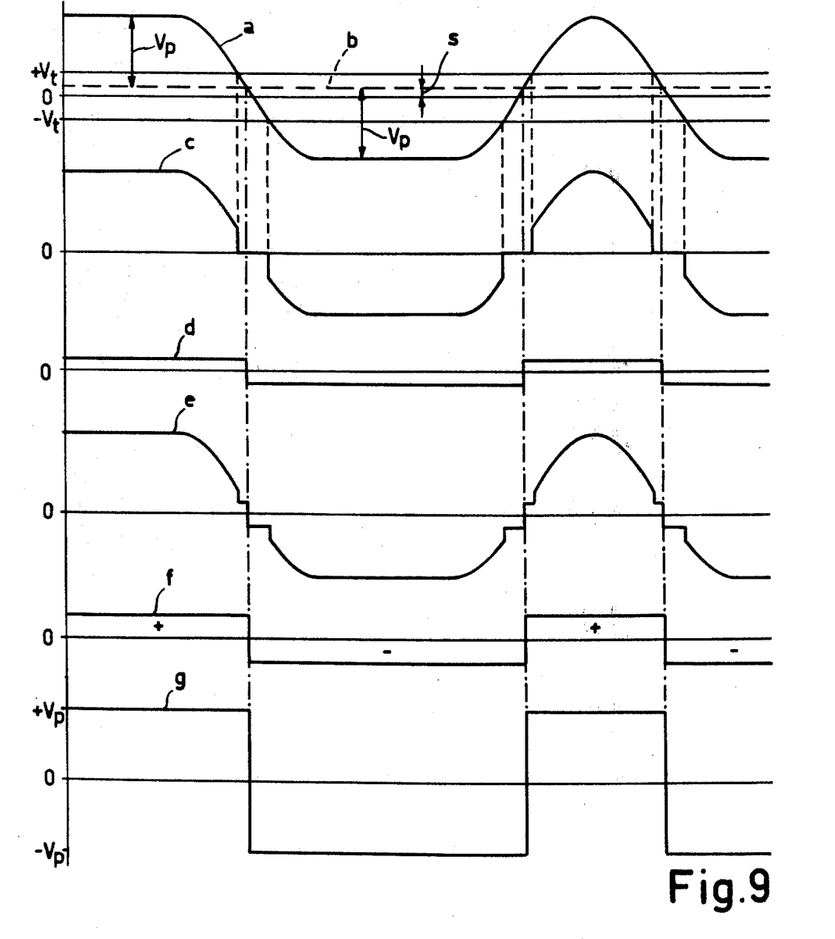
FIG. 9 shows a number of time diagrams to explain the operation of the correction circuit of FIG. 8.

The operation of the second branch 16 in FIG. 8 will now be described with reference to the time diagrams in FIG. 9 in which the telegraphy signal at the input of branch 16 is represented by curve a. Likewise as in FIG. 7, FIG. 9 shows the disturbing DC components by means of the shift s of the ideal zero line b of curve a relative to its real zero line and it has been assumed again that the peak values of curve a are located at the nominal distance $V_p$ from the ideal zero line b. Furthermore the threshold levels of threshold circuit 33 are denoted by $+V_t + -V_t$.

The shape of the input signal of amplifier 37 is derived by firstly assuming that comparator 19 continuously supplies a signal having a value of zero, by subsequently assuming that only branch 15 passes telegraphy signal a and a signal of the value of zero occurs continuously at the input of threshold circuit 33 and by finally accounting for the mutual influence of the real telegraphy signal a and the real decision signal of comparator 19.

In the first case a signal of the shape represented by curve c in FIG. 9 occurs at the input of amplifier 37 because threshold circuit 33 passes telegraphy signal a in a substantially unchanged form for values which are larger than $V_t$ (in fact, one of the diodes 35, 36 then conducts and its impedance is negligible relative to the resistors 38, 39), but threshold circuit 33 practically does not pass telegraphy signal a for values which are smaller than $V_t$ (in fact, both diodes 35,36 do not conduct and the resistors 38,39 are negligible relative to their impedances).

In the second case a binary signal of the shape represented by curve d in FIG. 9 occurs at the input of amplifier 37 in which signal the transitions take place at the instants when curve a intersects its ideal zero line b. In fact, when applying telegraphy signal a to amplifier 23, a binary decision signal will occur at the output of comparator 19 in which signal the transition instants coincide with the points of intersection of curve a and its ideal zero line b irrespective of the shift s of the ideal zero line b relative to the real zero line, as has been described extensively with reference to FIG. 7. The same decision signal then occurs also when applying the telegraphy signal at the output of the correction circuit in FIG. 8 which is assumed to differ only from telegraphy signal a in that the shift s is completely eliminated. In view of the choice of the resistors 38,39 the two diodes 35,36 can never conduct in this case so that the fraction of the decision signal occurring at the input of amplifier 37 has the shape of curve d in FIG. 9.

When applying the real telegraphy signal a to threshold circuit 33 and the real decision signal to summing circuit 32 a signal of the shape represented by curve e in FIG. 9 occurs at the input of amplifier 37. For values of telegraphy signal a which are larger than $V_t$ curve e substantially corresponds to curves c and a (in fact, one of the diodes 35,36 then conducts and the decision signal then has no influence on the input signal of amplifier 37). For values of telegraphy signal a which are less than $V_t$ curve e substantially corresponds to curve d (in fact, the telegraphy signal and the decision signal can neither separately nor jointly cause one of the two diodes 35,36 to conduct and the telegraphy signal then has no influence on the input signal of amplifier 37). The polarity of the output signal of summing circuit 32 varies in accordance with curve f in FIG. 9 and the binary output signal of bistable trigger 34 then has the shape of curve g in FIG. 9 in which the transitions take place at the instants when telegraphy signal a intersects its ideal zero line b.

Also in FIG. 8 the disturbing DC components of telegraphy signal a do not exert any influence on the levels or on the transition instants of the ultimate decision signal g. As already extensively described the DC components inherent in telegraphy signal a are then obtained by means of low-pass filter 20,17 and are combined with the AC components of telegraphy signal a which are obtained by means of high-pass filter 17,20. Consequently a telegraphy signal occurs at the output of the correction circuit in FIG. 8 whose shape accurately corresponds to the shape of telegraphy signal a, but whose real zero line coincides with the ideal zero line b of telegraphy signal a; the assumption made in the above-mentioned explanation is thus justified.

The jitter of the transition instants in the ultimate decision signal g caused by the deviations occurring in practice relative to the nominal peak values of the telegraphy signal are suppressed in the correction circuit of FIG. 8 in the same manner as in the correction circuit of FIG. 6 (namely by low-pass filter 20,17) and thus have no influence on the correct operation of the correct circuit. Also the occurrence of long static states of the telegraphy signal does not have any influence on the correct operation of the correction circuit because the galvanic continuity is then ensured by threshold circuit 33 and summing circuit 32 (the values of telegraphy signal a are then always larger than $V_t$ so that exclusively telegraphy signal a determines the polarity of the ultimate decision signal g).

The correction circuit according to FIG. 8 thus has all mentioned advantageous properties of the correction circuits according to FIGS. 1,5 and 8. In addition the correction circuit of FIG. 8 has a larger dynamic range because the DC components inherent in the telegraphy signal are recovered from the telegraphy signal at the output of the correction circuit. Although branch 16 in FIG. 8 is formed for this purpose in such a manner that a positive DC feedback is present, which of itself, under certain circumstances and particularly in case of higher than nominal transmission speeds or in case of pre-distortion might cause an unstable DC level, the DC level at the output of the correction circuit is FIG. 8 is always stable owing to the fact that branch 16 also has a negative DC feedback via peak detector 18. On grounds of the foregoing the embodiment of the correction circuit shown in FIG. 8 is preferred for a practical realization.

Many modifications of the described embodiments are possible within the scope of the present invention. For example, in FIG, 8 amplifier 37 may be formed in such a manner that its input signal is not only amplified but also limited. If the output levels of this amplifier 37 are then rendered equal to the nominal peak values of the telegraphy signal at the input of the correction circuit, bistable trigger 34 in FIG. 8 may be omitted because its function is taken over by this amplifier 37. Furthermore the series arrangement of two oppositely polarized Zener diodes may be used in peak detector 18 of FIG. 1 and FIG. 5 instead of the shown parallel arrangement of diodes 21,22 so that the desired constant signal value is constituted by the Zener voltage of a diode and not by its knee voltage. Alternatively, the input of branch 16 in FIGS. 1 and 6 and the output of branch 16 in FIG. 8 may be connected directly to the non-inverting input of comparator 19 instead of via amplifier 23 so that this amplifier 23 only operates as a separation amplifier for peak detector 18. In that case the telegraphy signal to be applied to the pulse regenerator may alternatively be derived from the output of amplifier 23 in FIG. 8 which amplifier 23 may then also be used for a possibly desired impedance and level adaptation of the correction circuit to the pulse regenerator.

What is claimed is:

1. A receiver in a transmission system for binary pulse signals, including an input circuit having a low output impedance from which the base band binary pulse signals are derived, a circuit connected to the input circuit for automatic correction of disturbances in the DC level of the binary pulse signals caused during transmission, and a pulse regenerator having a high input impedance to which the correction circuit and a reference source are connected for regenerating the binary pulse signals, said correction circuit comprising two parallel branches whose inputs are connected to the input circuit and whose outputs are connected to the pulse regenerator, the first branch including a series capacitor and the second branch including a peak detector for deriving a threshold signal from the peak values of the binary pulse signals and a comparator for generating a binary decision signal in response to both the threshold signal and the binary pulse signals, said comparator being coupled via a resistor to the output of the second branch, the time constant constituted by the resistor in the second branch and by the series capacitor in the first branch being much larger than the duration of an element in the binary pulse signals to suppress in said binary decision signal a.c. components related to transitions in the binary pulse signals so that the second branch passes d.c. components of the binary pulse signals.

2. A receiver as claimed in claim 1, wherein the peak detector is coupled to the input of the second branch of the correction circuit and the comparator is constituted by an operational amplifier having a non-inverting input for the binary pulse signals at the input of the second branch, an inverting input for the threshold signal originating from the peak detector, and an output connected to the resistor in the second branch.

3. A receiver as claimed in claim 1, wherein the second branch of the correction circuit includes a difference circuit having a non-inverting input for the binary pulse signals at the input of the second branch, an inverting input, and an output coupled to the inverting input via the peak detector and an amplifier for the threshold signal originating from the peak detector, said comparator being constituted by an operational amplifier having a non-inverting input connected to the output of the difference circuit, an inverting input connected to a point of reference potential, and an output connected to the resistor in the second branch.

4. A receiver as claimed in claim 1, wherein the second branch of the correction circuit includes a summing circuit having a first input coupled to the input of the second branch via a double-ended threshold circuit passing the binary pulse signals only for values which are larger than predetermined threshold levels, a second input, and an output coupled to the output of the second branch via said resistor, said peak detector being coupled to the output of the second branch and said comparator being constituted by an operational amplifier having a non-inverting input for the binary pulse signals at the output of the second branch, an inverting input for the threshold signal originating from the peak detector, and an output connected to the second input of the summing circuit.

5. A receiver as claimed in claim 4 wherein the peak detector includes two diodes whose unequal electrodes are interconnected, on junction constituting the input of the peak detector and the other junction being coupled to a point of reference potential via a capacitor shunted by a resistor having such a value that the discharge time constant of the capacitor is much larger than the duration of an element in the binary pulse signals, said other junction constituting the output of the peak detector from which the threshold signal is derived.

6. A receiver as claimed in claim 4, wherein the peak detector includes two parallel branches between the input and a point of reference potential, which branches are each constituted by a series connection of a diode and a capacitor, one pair of unequal electrodes of the diodes in the two branches being connected to the input of the peak detector and the other pair of unequal electrodes being interconnected via a series arrangement of two equal resistors whose junction is connected to the point of reference potential via a resistor, said resistors having such a value that the discharge time constant of the capacitors is much larger than the duration of an element in the binary pulse signals, the junction of the resistors constituting the output of the peak detector from which the threshold signal is applied to the inverting input of the comparator.

7. A receiver as claimed in claim 4, wherein the threshold circuit includes two diodes whose unequal electrodes are interconnected, one junction constituting the input and the other junction constituting the output of the threshold circuit.

* * * * *